United States Patent
Guenther et al.

(10) Patent No.: US 10,107,901 B2
(45) Date of Patent: Oct. 23, 2018

(54) ACOUSTIC SIGNAL PHASE ROTATION PROCESSOR

(71) Applicant: Sound Technology Inc., State College, PA (US)

(72) Inventors: Drake A. Guenther, Charlottesville, VA (US); Michael Fuller, Charlottesville, VA (US); Travis Blalock, Charlottesville, VA (US)

(73) Assignee: Sound Technology Inc., State College, PA (US)

( * ) Notice: Subject to any disclaimer, the term of this patent is extended or adjusted under 35 U.S.C. 154(b) by 114 days.

(21) Appl. No.: 15/118,909

(22) PCT Filed: Aug. 14, 2014

(86) PCT No.: PCT/US2014/051035
§ 371 (c)(1),
(2) Date: Aug. 15, 2016

(87) PCT Pub. No.: WO2015/126446
PCT Pub. Date: Aug. 27, 2015

(65) Prior Publication Data
US 2016/0356884 A1 Dec. 8, 2016

Related U.S. Application Data

(60) Provisional application No. 61/940,965, filed on Feb. 18, 2014.

(51) Int. Cl.
*G01S 7/00* (2006.01)
*G01S 7/52* (2006.01)
(Continued)

(52) U.S. Cl.
CPC ........ *G01S 7/52028* (2013.01); *G01S 7/5208* (2013.01); *G01S 7/52053* (2013.01);
(Continued)

(58) Field of Classification Search
CPC ............. G01S 7/52028; G01S 7/52053; G01S 7/5208; G01S 15/8925; G01S 15/8993; G10K 11/346
See application file for complete search history.

(56) References Cited

U.S. PATENT DOCUMENTS

| | | | |
|---|---|---|---|
| 5,488,588 A | 1/1996 | Engeler et al. | |
| 7,469,130 B2 * | 12/2008 | Mayer | H03F 3/24 330/149 |

(Continued)

FOREIGN PATENT DOCUMENTS

WO 20100018282 A1 2/2010

OTHER PUBLICATIONS

International search report for PCT/US2014/051035 published as WO 2015/126446 A1, dated Aug. 27, 2015.

(Continued)

*Primary Examiner* — Hovhannes Baghdasaryan
(74) *Attorney, Agent, or Firm* — Anthony M. Del Zoppo, III; Daugherty & Del Zoppo Co. LPA

(57) ABSTRACT

An ultrasound imaging system includes a plurality of processing chains ($206_1, \ldots, 206_K$) for a plurality of transducer element channels ($108_1, \ldots, 108_K$). A processing chain of the plurality of processing chains, includes: a phase rotation processor ($114_1, \ldots, 114_K$) that focuses an N-bit digital representation, of an analog RF signal received on the corresponding transducer element channel, through phase rotation through phase additions or subtractions, and outputs a focused N-bit quantized value, where N is a predetermined positive integer.

23 Claims, 6 Drawing Sheets

(51) Int. Cl.
*G01S 15/89* (2006.01)
*G10K 11/34* (2006.01)

(52) U.S. Cl.
CPC ........ *G01S 15/8925* (2013.01); *G10K 11/346* (2013.01); *G01S 15/8993* (2013.01)

(56) References Cited

U.S. PATENT DOCUMENTS

| | | | | |
|---|---|---|---|---|
| 7,502,278 | B1* | 3/2009 | Imbornone | G01S 3/801 367/103 |
| 8,370,413 | B1 | 2/2013 | Fleizach et al. | |
| 9,033,888 | B2 | 5/2015 | Brown | |
| 9,254,116 | B2 | 2/2016 | Dahl | |
| 2007/0236374 | A1* | 10/2007 | Brueske | G01S 7/52028 341/143 |
| 2012/0190985 | A1* | 7/2012 | Hisatsu | A61B 8/5269 600/459 |
| 2013/0109969 | A1 | 5/2013 | Kim et al. | |

OTHER PUBLICATIONS

Camacho, J., et al., Grating-lobes reduction by application of Phase Coherence Factors, 2009 IEEE International Ultrasonics Symposium Proceedings, Sep. 2009.

Camacho, J. et al., Phase Coherence Imaging of Grained Materials, IEEE Transactions on Ultrasonics, Ferroelectrics and Frequency Control, vol. 58, No. 5, May 2011.

Pinton, G., et al., Impact of clutter levels on spatial covariance: implications for imaging, 2010 IEEE International Ultrasonics Symposium Proceedings, Oct. 2010.

Dahl, J. et al., Harmonic Spatial Coherence Imaging: An Ultrasonic Imaging Method Based on Backscatter Coherence, IEEE Transactions on Ultrasonics, Ferroelectrics, and Frequency Control, vol. 59, Issue 4, pp. 648-659 Apr. 2012.

Camacho J. et al. Adaptive Beamforming by Phase Coherence Processing, Ultrasound Imaging, Mr Masayuki Tanabe (Ed.), InTech, DOI: 10.5772/15531. Available from: http://www.intechopen.com/books/ultrasound-imaging/adaptive-beamforming-by-phase-coherence-processing (2011).

Jia, Y., et al., 3D ultrasound coherence imaging based on 2D array design, Medical Imaging 2013: Ultrasonic Imaging, Tomography and Therapy, Proc. SPIE 8675, Medical Imaging 2013: Ultrasonic Imaging, Tomography, and Therapy, 86750V (Mar. 29, 2013); doi: 10.1117/12.2006592: Mar. 29, 2013.

Kim, BH, et al., Hybrid Volume Beamforming for 3-D Ultrasound Imaging using 2-D CMUT Arrays, 2012 IEEE International Ultrasonics Symposium, Oct. 2012.

Mauldin, F, et al. A Singular Value Filter for Rejection of Stationary Artifact in Medical Ultrasound, 2010 IEEE International Ultrasonics Symposium Proceedings (2010).

Wang, YH, SNR-Dependent Coherence Weighting for Minimum Variance Beamforming, IEEE International Ultrasonics Symposium (2011).

Camacho, J., Phase Coherence Imaging, IEEE Transactions on Ultrasonics, Ferroelectrics, and Frequency Control, vol. 56, No. 5, May 2009.

Lediju, M., Short-Lag Spatial Coherence of Backscattered Echoes: Imaging Characteristics, IEEE Transactions on Ultrasonics, Ferroelectrics, and Frequency Control, vol. 58, No. 7, Jul. 2011.

Kim, JJ, An Ultrasound Beamforming method using 1.5 bit ADCs for Portable Ultrasound Scanners, IEEE Transactions on Ultrasonics, Ferroelectrics, and Frequency Control Joint 50th Anniversary Conf., 2004.

Mallart, R., et al., The Van Cittert-Zernike Theorem in Pulsed Ultrasound. Implications for Ultrasonic Imaging, 1990 Ultrasonics Symposium, pp. 1603-1607 (1990).

Ranganathan, K. et al., Direct Sampled I/Q beamforming for compact and very low-cost ultrasound imaging, IEEE Transactions on Ultrasonics, Ferroelectrics, and Frequency Control, Vo. 51, No. 9, (Sep. 1, 2004).

\* cited by examiner

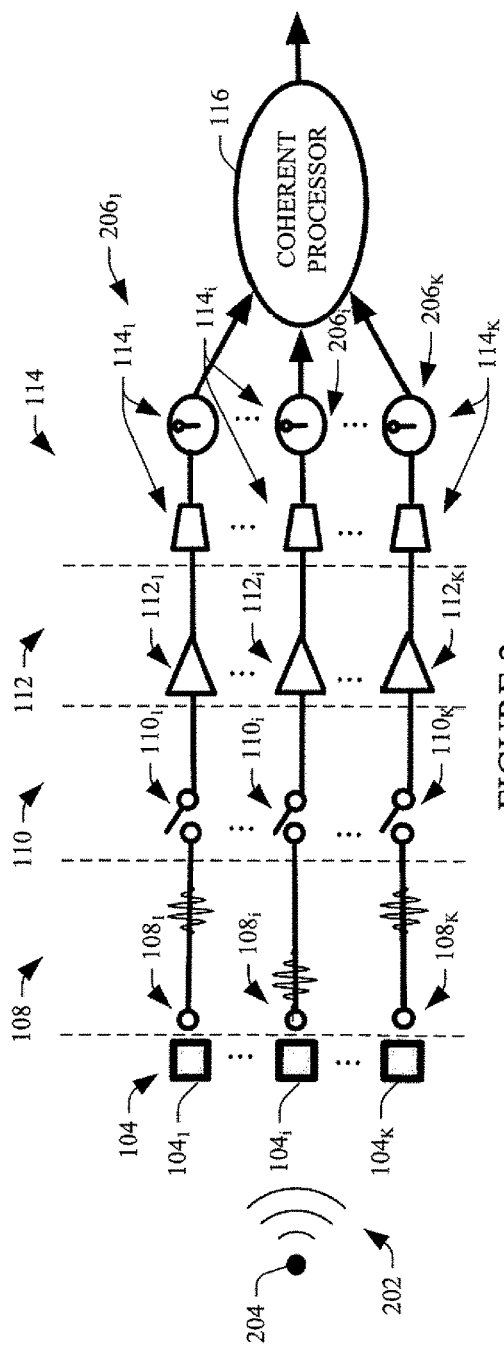
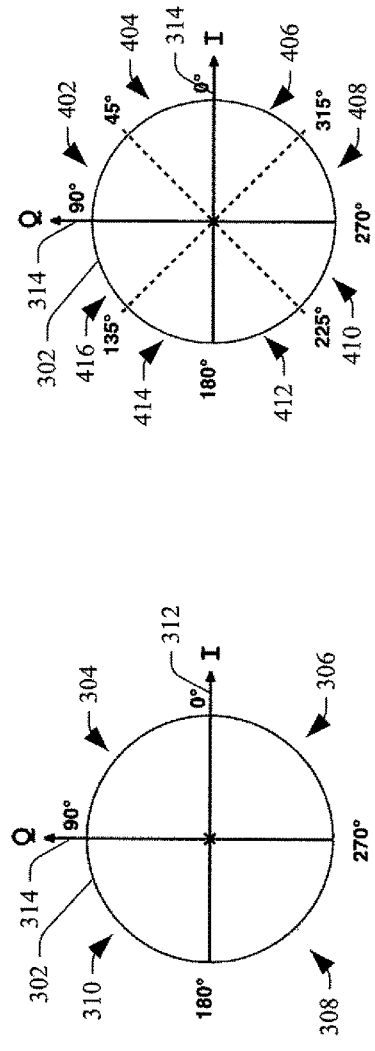
FIGURE 2
FIGURE 3
FIGURE 4

ACOUSTIC SIGNAL PHASE ROTATION PROCESSOR

RELATED APPLICATION

This application is a national filing of PCT application Serial No. PCT/US2014/051035, filed Aug. 14, 2014, published as WO2015/126446 A1 on Aug. 27, 2015, which claims the benefit of priority of provisional patent application serial number U.S. 61/940,965 filed on Feb. 18, 2014, confirmation number 2107, and entitled "METHODS AND SYSTEMS FOR A LOW COMPLEXITY COHERENT BEAMFORMER" which is incorporated herein in its entirety by reference.

TECHNICAL FIELD

The following generally relates to acoustics and is described with particular application to ultrasound imaging; however, the following is also amenable to sonar, radar, non-destructive evaluation, and/or other phase coherent acoustic signal detection and/or processing applications.

BACKGROUND

An ultrasound imaging system provides useful information about the interior characteristics of an object or subject under examination. Ultrasound B-mode images have included grayscale information related to the magnitude of the reflected acoustic signal at each point imaged. Different forms (e.g., tissue elasticity, sound speed, optical absorption, spatial coherence, etc.) of image contrast provide additional useful information.

The quality of an ultrasound image depends on many factors. Examples of such factors include, but are not limited to, the physics of acoustic propagation, reflection, and diffraction phenomena. The quality of an ultrasound image is also impacted by the approaches by which the acoustic echoes are sampled by the front end analog/digital hardware. The quality of an ultrasound image is also impacted by the approaches by which the sampled acoustic echoes are subsequently processed by the beamformer.

The literature has focused on beamforming strategies. These strategies have ranged from passive techniques (e.g. apodization, spatial compounding, frequency compounding, coded excitation, etc.) to data adaptive techniques (e.g., minimum variance distortionless response, Capon, coherent processing, phase coherence processing, spatial coherence processing, etc.). However, most, if not all, of these techniques offer a tradeoff between resolution, contrast, signal-noise-ratio (SNR), computational complexity, and/or artifact suppression.

A trend in medical ultrasound has been the advancement of real-time 3D imaging and the application of a large transducer element count (e.g., greater than one thousand (1000) transducer elements) two-dimensional (2D) phased array. Unfortunately, the processing demands, as well as hardware complexities, consumed to utilize such a large number of transducer elements in an array places even further constraints on the processing strategies employed during data processing.

SUMMARY

Aspects of the application address the above matters, and others.

In one aspect, an ultrasound imaging system includes a plurality of processing chains, including at least one processing chain for each transducer element channel. A processing chain of the plurality of processing chains, includes: a phase rotation processor that focuses an N-bit digital representation of an analog RF signal received on the corresponding transducer element channel, through phase rotation by phase additions or subtractions, and outputs a focused N-bit quantized value, where N is a predetermined positive integer.

In another aspect, a method includes processing a plurality of digital representations only a phase of an analog RF ultrasound signal through phase rotations that include phase additions or subtractions, thereby generating quantized values for the plurality of digital representations; and generating focused quantized values for the plurality of digital representations from the quantized values.

In another aspect, a system includes an apparatus, which includes a display, memory with instructions, and a processor that processes the instructions. The processor, in response to executing the instructions, focuses an N-bit digital representation of a phase coherent analog signal through phase rotation by phase additions or subtractions and no multiplications, determines phase coherency information from the focused N-bit digital representation; and displays, via the display, the phase coherency information.

Those skilled in the art will recognize still other aspects of the present application upon reading and understanding the attached description.

BRIEF DESCRIPTION OF THE DRAWINGS

The application is illustrated by way of example and not limitation in the figures of the accompanying drawings, in which like references indicate similar elements and in which:

FIG. 2 illustrates an example configuration of the I/O sampler, the digitizer, the phase rotation processor, and the coherent processor;

FIG. 3 shows a unit circle divided into quadrants for 2-bit phase digitization by the digitizer;

FIG. 4 shows a unit circle divided into octants for 3-bit phase digitization by the digitizer;

DETAILED DESCRIPTION

Figure 1:
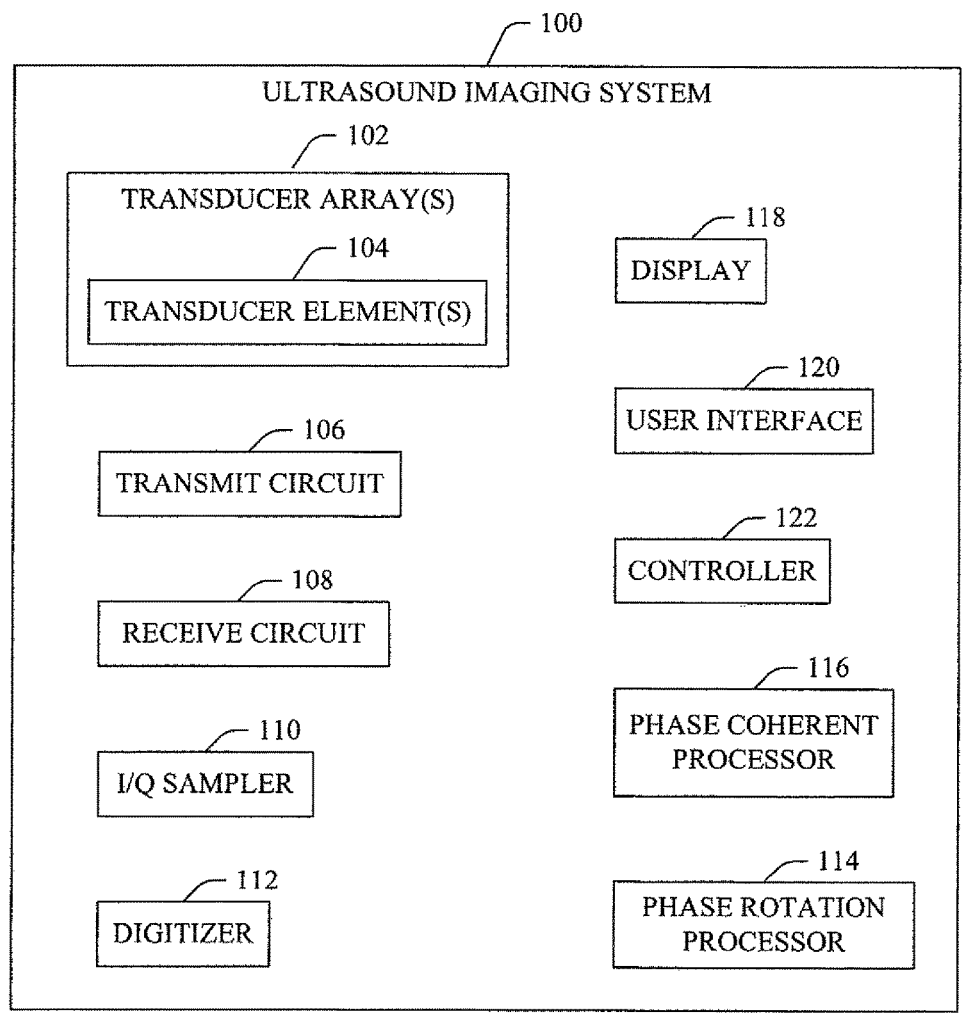
FIG. 1 schematically illustrates an ultrasound imaging system that includes at least an I/O sampler, a digitizer, a phase rotation processor, and a coherent processor.

FIG. 1 schematically illustrates an acoustic system such as an ultrasound imaging system 100. Alternatively or additionally, the acoustic system could include a sonar, a radar, a non-destructive evaluation, and/or other phase coherent acoustic signal detection and/or processing system.

The illustrated ultrasound imaging system 100 includes one or more transducer arrays 102. The one or more transducer arrays 102 can include, but are not limited to, one or more of a 1D array, a 1.5D array, a 1.75D array, a 2D array, and/or other array(s). Each of the transducer arrays 102 includes one or more transducer elements 104. An array of elements can include a linear, a curved, and/or otherwise shaped array, and/or fully populated, sparse, etc., array.

The ultrasound imaging system 100 further includes transmit circuitry 106 that controls excitation of the one or more transducer elements 104 of the transducer arrays 102 to transmit ultrasound signals. The ultrasound imaging system 100 further includes receive circuitry 108 with channels that route RF analog (echo) signals from the transducer elements 104 to other components of the ultrasound imaging system 100 for processing.

The ultrasound imaging system 100 further includes an I/Q sampler 110. In one instance, the I/Q sampler 110 acquires I/Q pairs of samples in the analog domain. This can be achieved using various approaches. An example of a suitable approach is described in Ranganathan, K. et al., "Direct sampled I/Q beamforming for compact and very low-cost ultrasound imaging," IEEE Trans. Ultrasonics, Ferroeclectrics, and Freq. Control, volume 51(9), September 2004, pages 1082-94.

With this approach, echoes are sampled based on a nominal carrier frequency at quarter-period sample spacing to produce complex IQ data pairs, which reduces the sampling rate, relative to configuration in which the complete time records sampled at high sample rates on each channel are stored. For example, for one I/Q pair per signal period and a center frequency of 5 MHz, a reduction on an order of four (4) in data bandwidth, relative to a configuration acquiring uniformly spaced samples at 40 MHz, can be realized. Other approaches are also contemplated herein.

The ultrasound imaging system 100 further includes a digitizer 112. The digitizer 112 quantizes the phase of each I/Q pair on each channel of receive circuitry 108 into an N-bit (where N is a positive integer) representation. As described in greater detail below, this can be achieved through at least a set of comparators and, depending on a value of N, a set of analog polarity inverters. A phase resolution of the phase digitizer 112 corresponds to a number of bits used to digitize the phase information for each I/Q pair.

An example number of bits includes two (2), three (3), four (4), or more per I/Q sample pair. Two or 3-bits per I/Q sample pair may provide for a factor of 6.7 to 12 reduction in data bandwidth relative to a configuration with 10-12 bit amplitude resolution. In a configuration in which the I/Q sampler 110 is omitted and a conventional delay (e.g., RF sampling scheme such as 40 MHz, IQ demodulation, etc.) and sum beamformer is used, the digitizer 112 can quantize phase information after the delay and apodization (weighting) operations. In another example, the phase quantization need not be after delay and apodization. Other approaches are also contemplated herein.

The ultrasound imaging system 100 further includes a phase rotation processor 114. The phase rotation processor 114 receives the N-bit quantized values associated with the phase of the signal (and not the amplitude) on each channel of receive circuitry 108 for each of the transducer elements 104. As described in greater detail below, the phase rotation processor 114 focuses (time delays) the N-bit quantized values for the channels of receive circuitry 108, e.g., through phase rotation. In one instance, this can be achieved through phase additions or subtractions, without any multiplications, but multiplications can be applied. The delays applied/phase rotations applied may follow a predetermined or other delay curve.

The ultrasound imaging system 100 further includes a phase coherent processor 116. The phase coherent processor 116 processes the time aligned N-bit quantized values of the receive channels $108_1, \ldots, 108_i, \ldots, 108_K$, generating a signal indicative of a phase coherency of the underlying N-bit quantized values. For lower values of N, the phase coherent processor 116 processes less data, relative to higher values of N. The savings in computational complexity renders this processing well suited for larger data applications such as processing data acquired with 2D arrays, volumetric imaging, etc.

The ultrasound imaging system 100 further includes a display 118. The phase coherent processor 116 visually presents the coherency information via the display 118. The ultrasound imaging system 100 further includes a user interface 120. The user interface 120 includes an input device(s) (e.g., a mouse, keyboard, touch controls, etc.), which allows for user interaction with the system 100. The ultrasound imaging system 100 further includes a controller 122.

The controller 122 controls the one or more transducer arrays 102, the one or more transducer elements 104, the transmit circuitry 106, the receive circuitry 108, the I/O sampler 110, the digitizer 112, the phase rotation processor 114, the coherent processor 116, the display 118, and the user interface 120. This includes controlling one or more of these components for A-mode, B-mode, C-scan, and/or other ultrasound imaging, including phase coherent imaging.

At least one of the I/Q sampler 110, the digitizer 112, the phase rotation processor 114, or the coherent processor 116 is implemented through hardware (e.g., an ASIC, IC, FPGA, etc.) and/or one or more computer processors (e.g., a microprocessor, a control processing unit, a controller, etc.) executing one or more computer readable instructions encoded or embodied on computer readable storage medium (which excludes transitory medium), such as physical computer memory, which causes the one or more computer processors to carry out the various acts and/or functions described herein and/or other acts and/or functions. Additionally or alternatively, the one or more computer processors can execute instructions carried by transitory medium such as a signal or carrier wave.

Turning to FIG. 2, an example of a sub-set of the transducer elements 104, the receive circuitry 108, the I/Q sampler 110, the digitizer 112 and the phase rotation processor 114 for the sub-set, and the coherent processor 116 are illustrated. In this example, the sub-set of the transducer elements 104 includes transducer elements $104_1, \ldots, 104_i, \ldots, 104_K$ (where K is a positive integer and i=1 to K). The sub-set of the transducer elements 104 receives echoes 202 corresponding to a structure 204.

In the illustrated example, each of the transducer elements $104_1, \ldots, 104_K$ includes its own processing chain $206_1, \ldots, 206_i, \ldots, 206_K$. Each of the processing chain $206_1, \ldots, 206_i, \ldots, 206_K$ includes a receive channel $108_1, \bullet_i, \ldots, 108_K$ and a sub-I/Q sampler $110_1, \ldots, 110_i, \ldots, 110_K$, and each of the sub-I/Q samplers $110_1, \ldots, 110_i, \ldots, 110_K$ includes a sub-digitizer $112_1, \ldots, 112_i, \ldots, 112_K$, and a sub-phase rotation processor $114_1, \ldots, 114_i, \ldots, 114_K$. In a variation, a processing chain can include more than one sub-I/Q samplers 110, sub-digitizer 112 and/or sub-phase rotation processor 114.

The illustrated phase digitizer 112 quantizes the phase information into an N-bit representation. In this example, the phase digitizer 112 quantizes the phase information based off dividing a unit circle into $2^N$ sections. Examples of this are shown in connection with FIGS. 3 and 4.

In FIG. 3, a unit circle 302 is divided into quadrants 304, 306, 308 and 310 for 2-bit phase digitization. An axis 312 represents the I sample of an I/Q pair and an axis 314 represents the Q sample of the I/Q pair. The phase of a sampled I/Q pair can be quantized into the four quadrants as shown in Table 1. In Table 1, "+" indicates positive polarity and "−" indicates negative polarity, both with respect to an analog reference.

TABLE 1

Phase quantization for 2-bit phase digitization.

| I | Q | Phase Quantization | Digital Representation |
|---|---|---|---|
| + | + | 0° | 11 |
| − | + | 90° | 01 |
| − | − | 180° | 00 |
| + | − | 270° | 10 |

In FIG. 4, the unit circle 302 is divided into octants 402, 404, 406, 408, 410, 412, 414 and 416 for 3-bit phase digitization. For 3-bit phase digitization, the phase of the I/Q pair can be quantized into 8 octants according to Table 2. In Table 2, "+" and "−" have the same meanings as in Table 1, but a third comparison is added to determine a relative magnitude between the I and Q samples.

TABLE 2

Phase quantization for 3-bit phase digitization.

| I | Q | |I| ? |Q| | Phase Quantization | Digital Representation |
|---|---|---|---|---|
| + | + | |I| > |Q| | 0° | 111 |
| + | + | |I| < |Q| | 45° | 110 |
| − | + | |I| < |Q| | 90° | 010 |
| − | + | |I| > |Q| | 135° | 011 |
| − | − | |I| > |Q| | 180° | 001 |
| − | − | |I| < |Q| | 225° | 000 |
| + | − | |I| < |Q| | 270° | 100 |
| + | − | |I| > |Q| | 315° | 101 |

In Table 2, while the digitization of phase in the 3-bit case produces unique digital values for each phase bin, the binary values increment is not in order with increasing phase. In this example, the binary values follow a form of Gray coding in which only a single bit changes at a time when transitioning between adjacent quadrants (2-bit case) or octants (3-bit case). This can be accounted for prior to processing using a lookup table (LUT) or digital logic.

Figure 5:
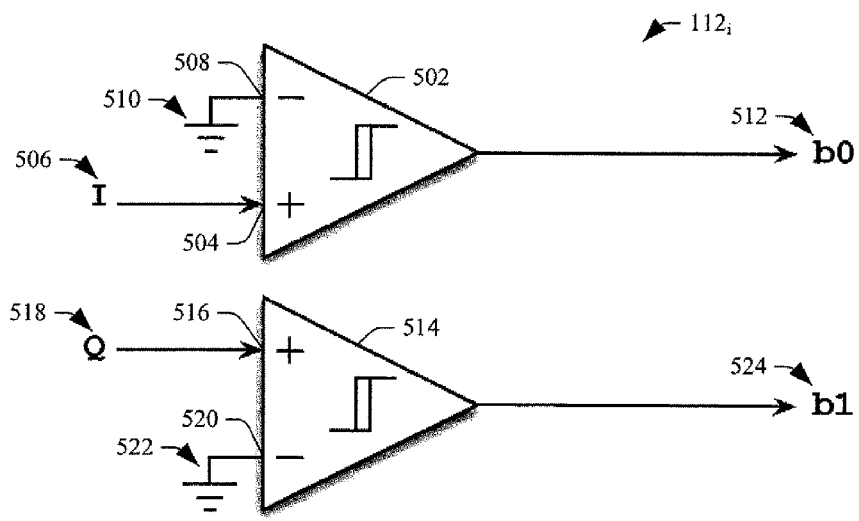
FIG. 5 illustrates an example digitizer for 2-bit phase digitization of an I/Q sample pair for a channel.

FIG. 5 shows an example of one of the sub-digitizers $112_1, \ldots, 112_i, \ldots, 112_K$ of FIG. 2 for 2-bit phase digitization of an I/Q pair of samples acquired in the analog domain with the phase quantization of Table 1. For sake of brevity and explanatory purposes, FIG. 5 will be described with reference to the sub-digitizer $112_i$. However, this description applies to all of the sub-digitizers $112_1, \ldots, 112_i, \ldots, 112_K$. In a variation, at least one of the sub-digitizers $112_1, \ldots, 112_i, \ldots, 112_K$ can be different. An I comparator 502 includes a positive or first input 504 that receives an I sample 506 and a negative or second input 508 that receives a reference signal 510. The reference signal 510 can be a voltage, current, or other quantity. In this example, the reference signal 510 is electrical ground. In other embodiments, other reference signals can be used. The I comparator 502 determines, based on the input signals, whether the I sample 506 is positive or negative, relative to reference signal. The I comparator 502 outputs a signal (b0) 512 indicative of this determination.

A Q comparator 514 includes a positive or first input 516 that receives a Q sample 518 and a negative or second input 520 that receives a reference signal 522. In this example, the reference signal 522 is the same as the reference signal 510. In a variation, the reference signal 522 can be different than the reference signal 510. The Q comparator 514 determines, based on the input signals, whether the Q sample 518 is positive or negative, relative to reference signal. The Q comparator 514 outputs a signal (b1) 524 indicative of this determination.

Figure 6:
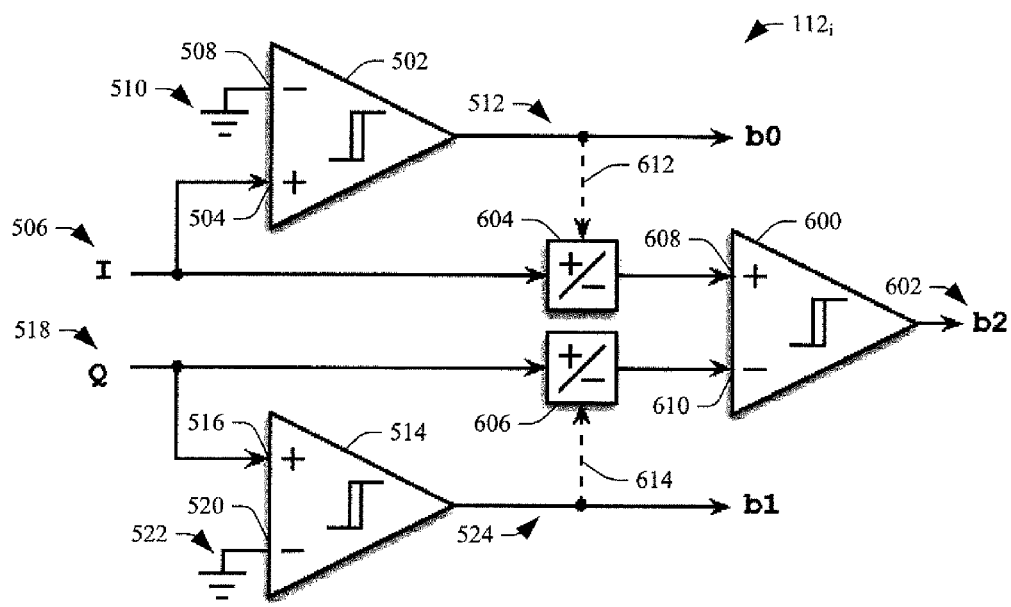
FIG. 6 illustrates an example sub-digitizer for 3-bit phase digitization of an I/Q sample pair for a channel.

FIG. 6 shows an example of one of the sub-digitizers $112_1, \ldots, 112_i, \ldots, 112_K$ of FIG. 2 for 3-bit phase digitization of an I/Q pair of samples acquired in the analog domain with the phase quantization of Table 2. For sake of brevity and explanatory purposes, FIG. 6 will be described with reference to the sub-digitizer $112_i$. However, this description applies to all of the sub-digitizers $112_1, \ldots, 112_i, \ldots, 112_K$. In a variation, at least one of the sub-digitizers $112_1, \ldots, 112_i, \ldots, 112_K$ can be different.

FIG. 6 includes the circuit of FIG. 5 with an additional comparator 600 and analog polarity inverters 604 and 606. The additional comparator 600 includes a positive or first input 608 and a negative or second input 610. A positive or first input 608 receives, as an input, an output of the analog polarity inverter 604. A negative or second input 610 receives, as an input, an output of the analog polarity inverter 606. The additional comparator 600 compares the output of the polarity inverters 604 and 606 and produces an output signal (b2) 602 that is indicative of a magnitude between the I and Q analog samples.

The analog polarity inverters 604 and 606 can be used to aid in determining a relative magnitude of the I and Q analog samples. This can be accomplished by leaving an analog sample unaltered if the analog sample is positive or inverting the analog sample if the analog sample is negative. The positive/negative determinations for I and Q are already performed by the comparators 502 and 514 so their outputs 512 (b0) and 524 (b1), respectively, can be used as control signals 612 and 614 to determine whether the polarity inverters 604 and 606 perform polarity inversion. That is, a control signal 612 (or 614) evoke the polarity inverter 604 (or 606) to perform polarity inversion in response to the control signal 612 (or 614) being negative.

In one instance, the polarity inverters 604 and 606 include a pair of unity-gain buffers, one inverting and one non-inverting, whose outputs are multiplexed based on the control signal. In another instance, the polarity inverters 604 and 6060 are implemented through a switched-capacitor technique to perform the inversion. If the receive circuitry 108 is differential (as opposed to single-ended), then the polarity inverters 604 and 606 can be implemented through a set of switches that exchange the two differential branches of the signal path. This approach would add minimal area and consume no additional static power, both of which are advantageous for high channel-count systems.

The comparators 502, 514 and 600 should have sufficient gain, low noise, and minimal offset to reduce quantization noise, which are errors in distinguishing phases near bin boundaries. However, speed requirements are significantly relaxed compared to comparable comparator circuits used in 10-bit or greater high-speed analog-to-digital converters.

FIGS. 3-6 and Tables 1 and 2 shows examples for 2 and 3-bit phase digitization. However, it is to be appreciated that the digitizer 112 (FIGS. 1 and 2) can be implemented for more than 3 bits of phase quantization. Such variations may include additional circuitry.

Returning to FIG. 2, the sub-phase rotation processor $114_1, 114_i, \ldots, 114_K$ respectively focus (time delay) the N-bit quantized values of the receive channels $108_1, \ldots, 108_i, \ldots, 108_K$. In this example, each of the sub-phase rotation processors $114_1, \ldots, 114_i, \ldots, 114_K$ is configured to focus an N-bit quantized value of a corresponding one of the receive channel $108_1, \ldots, 108_i, \ldots, 108_K$ through phase rotation through phase additions or subtractions, without multiplication. However, multiplication can be applied.

In this example, each of the illustrated sub-phase rotation processors $114_1 \ldots 114_i \ldots 114_K$ includes only a single or one complex weight per channel In a variation, the sub-phase rotation processors $114_1 \ldots 114_i \ldots 114_K$ could include an FIR processor (with multiple taps, weights on each channel), which uses multiple samples (complex phases) on each channel as input into the coherent processor.

The phase coherent processor 116 processes the time aligned N-bit quantized values and generates a value indicative of a coherency of the underlying N-bit quantized values. In one instance, this includes analyzing the data in such a way as to show relevant information about the tissue or region of interest. Such information represents a new form of image contrast for ultrasound imaging, indicating whether tissue of interest is present or absent. Such information also includes information that is not clear in the B-mode images and is devoid of speckle artifact.

Examples of suitable phase coherent processing approaches include, but are not limited to, a phase coherence factor approach, a sign coherence factor approach, and a short lag spatial coherence (SLSC) metric approach.

The phase coherence factor and sign coherence factor approaches measure the dispersion of phases in the pre-sum channel data. The SLSC metric approach computes normalized cross correlation utilizing real (non-complex) data at short lags of the pre-sum phase rotated data. A phase only SLSC metric approach can be computed utilizing complex phases with varying bit resolutions. An advantage of this approach (phase only) is reduced computational complexity given the large computational burden of computing cross correlations on pre-summed data, not to mention the significant potential for reducing the complexity of front-end receive electronics.

Another coherency metric that could be computed on the phase only focused data is a quadrature coherence factor (QCF). The QCF Factor approach in a one dimensional (1D) aperture of M elements can be computed as follows. With focused, complex aperture data, including M IQ pairs, where the data is a phase only representation with N-bits quantization, 1.5-bit quantization for the IQ data (quadrant decimation) can be achieved as follows: I=0 if I==0; I=1 if I>0; I=−1 if I<0; Q=0 if Q==0; Q=1 if Q>0, and Q=−1 if Q<0.

The I and Q components can be coherently summed, for 1.5-bit representation and perfect coherency across the aperture, as follows: sum(IQ)=M+jM, where j is sqrt(−1). The magnitude of the resulting vector can be computed and normalized as follows. For 1.5-bit representation and perfect coherency across the aperture, QCF(k)=Sqrt(M+jM)(M−jM))/sqrt(2)M=sqrt(2)M/sqrt(2)M=1, where k indicates the QCF at one position in the final image, and a QCF value of 1 indicates perfect coherency.

Extending the SLSC metric to work with pure complex phase data, the normalized cross correlation matrix, R, of the one dimensional (1D) focused aperture data $x_{PQ}(m)$, (m=1:M elements) can be computed as follows:

$$R(m, \text{lag}) = \frac{\sum_{i=0}^{npairs} x_i^*(m)x_i(\text{lag})}{\sqrt{\sum_{i=0}^{npairs}(x_i^*(m)x_i(m)) \sum_{i=0}^{npairs}(x_i^*(\text{lag})x_i(\text{lag}))}},$$

where * denotes complex conjugation. In the case of pure phase information, these cross correlations reduce to simple phase additions and subtractions. The N-bit quantization of the phases could reduce computational complexity here as well.

The SLSPC factor can be computed by computing various metrics from the associated matrix R. One such metric is a coherence curve where the average correlation values for each lag are computed, and then this curve is integrated from 0 lag to some specified lag resulting in a value corresponding to spatial phase coherency. A high value indicates high phase coherency (target) and a low value would indicate low spatial phase coherency across the aperture.

Other useful metrics from matrix R could be used as well, including Eigen value analysis or even a matrix decomposition and later projection of the pre-summed data onto a set of associated eigenvectors. This type of eigenvector filtering and subspace projection is well known in the signal processing literature.

The phase coherent processor 116 visually presents the coherency information via the display 118. An alternative approach is to use the coherency information as a weighting function to apply to a magnitude reflectivity image, which results in improved image contrast, enhanced resolution, and artifact/clutter reduction.

Variations are contemplated.

In a variation, the I/Q sampler 110, for each of the receive channel $108_1, \ldots, 108_i, \ldots, 108_K$, includes just two sample-and-hold circuits to capture the I and Q analog samples.

In another variation, a pre-amplification stage may be used to mitigate comparator noise and offset, which may become more significant in the presence of low-amplitude signals.

In another variation, a compressor-limiter is utilized to maintain large signal swing at the comparator input whilst avoiding distortion. This may improve an accuracy of the phase digitizer in the presence of wide dynamic range signals on the receive channels $108_1, \ldots, 108_i, \ldots, 108_K$.

In another variation, the impact of non-ideal circuit behavior is taken into account, particularly for small amplitude signals where contributions such as clock noise, hold pedestal, and charge-injection in the sample-and-hold circuit become significant.

In another variation, a hybrid approach could be used in which a single M-bit amplitude digitization is performed alongside the N-bit phase digitization. This digital value could be based on the peak or root-mean-square amplitude over a desired time constant or time window and could be used in beamforming or other signal processing to weight lower-amplitude signals differently than larger-amplitude signals. For example, M=1 could serve as a "quality" bit, e.g., to "squelch" signal amplitudes below the noise floor.

In another variation, the phase coherent processor 114 is used in connection with a conventional, non-phase producing, front-end system. With this variation, the phase coherent processor 114 produces phase only information the data from the conventional, non-phase producing, front-end system. Likewise, the phase coherent processor 114 analyzes the data in such a way as to show relevant information about the tissue or region of interest, using the enumerated and/or coherent processors.

The approach described herein is described in the context of ultrasound imaging. As such, the approach described herein may be used for medical imaging, including diagnostic imaging, procedure guidance imaging, and treatment related imaging. However, the approach described herein it is also amenable to other systems comprising one or more transducers, a computer, display and user interface, and/or signals that are weakly scattering and embedded in a continuously scattering medium. For example, the phase only coherent processing described herein can also be used in radar and sonar where time-Doppler analysis of returning echoes can be difficult given typical waveform ambiguity functions and associated clutter in real world scenarios.

The phase only coherent processing described herein could also be used in non-destructive evaluation and/or used during beamforming, as described herein, or in situations where array analysis cannot be done, applying the coherency results to the matched filter output. With this approach a phase coherent factor could be computed using the pre-summed matched filter results. Generally, the phase only coherent processing described herein can be applied to any coherent range finding acoustic method and/or system.

Figure 7:
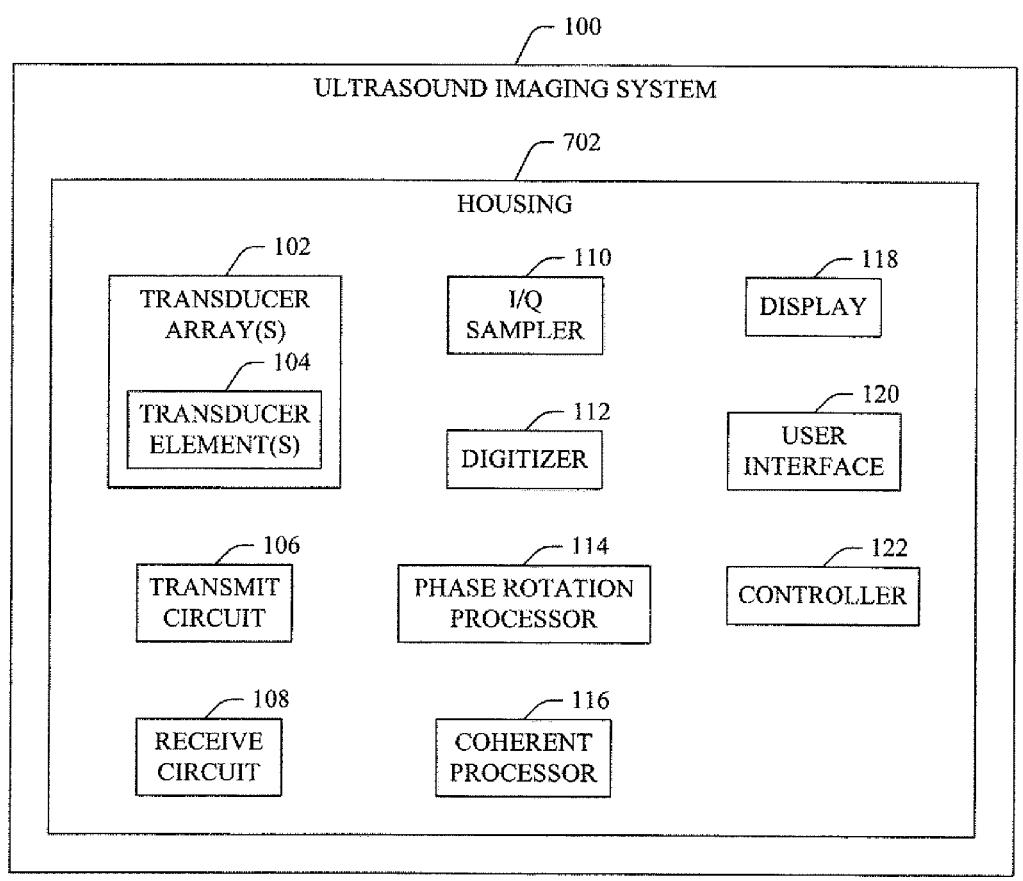
FIG. 7 schematically illustrates the ultrasound imaging system configured as a hand-held device.

In FIG. 7, the ultrasound imaging system 100 is included in a hand-held device with a single enclosure or housing 702, which houses and physically supports the one or more transducer arrays 102, the one or more transducer elements 104, the transmit circuitry 106, the receive circuitry 108, the I/Q sampler 110, the digitizer 112, the phase rotation processor 114, the coherent processor 116, the display 118, the user interface 120, and the controller 122 in the system 100. An example of a hand-held device is described in U.S. Pat. No. 7,699,776 to Walker et al., entitled "Intuitive Ultrasonic Imaging System and Related Method Thereof," and filed on Mar. 6, 2003, which is incorporated herein in its entirety by reference. Other hand-held devices are also contemplated herein.

Figure 8:
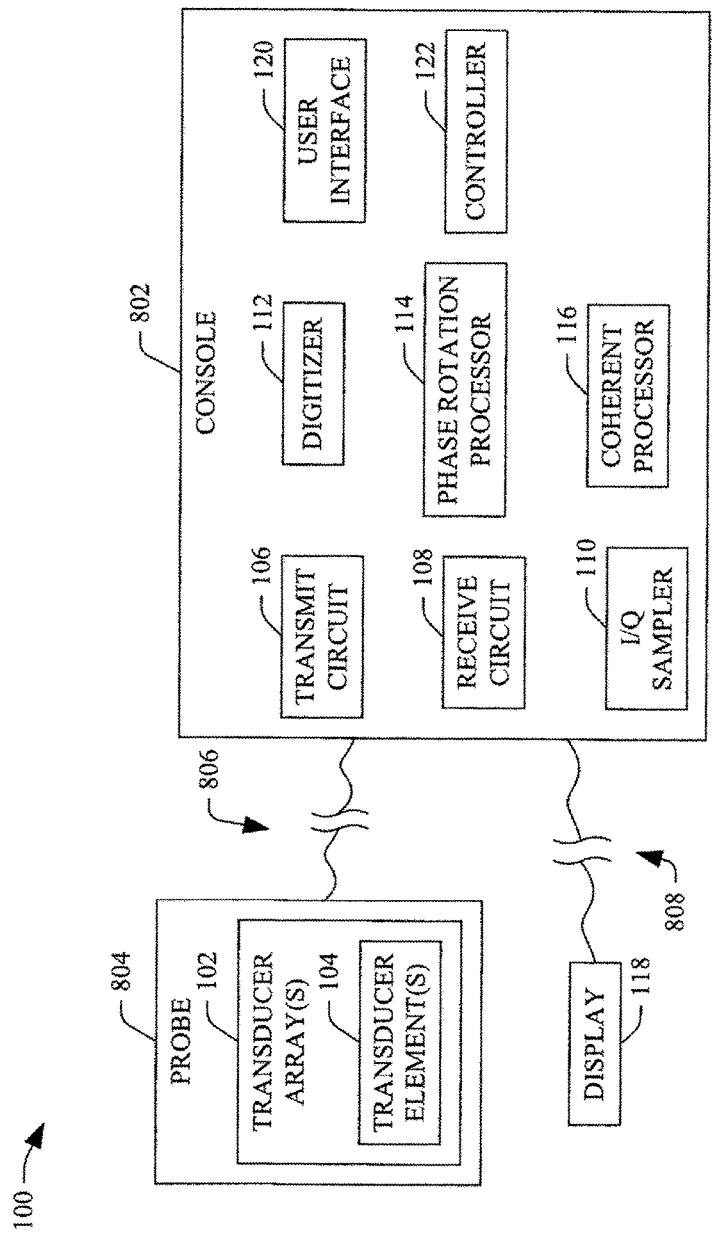
FIG. 8 schematically illustrates the ultrasound imaging system including a separate probe, console and display.

In FIG. 8, the ultrasound imaging system 100 includes a console 802 and a separate transducer probe 804 that interfaces therewith via a communication channel 806. The ultrasound transducer probe 804 includes the one or more transducer arrays 102 with the one or more transducer elements 104. The console 802 includes the transmit circuitry 106, the receive circuitry 108, the I/Q sampler 110, the digitizer 112, the phase rotation processor 114, the coherent processor 116 and the user interface 120. The display 118 is shown separate from the console 802 and the transducer probe 804 and interfaced with the console 802 via a communication channel 808. In a variation, the ultrasound transducer probe 804 is additionally or alternatively part of the console 802 and the transducer probe 804.

Figure 9:
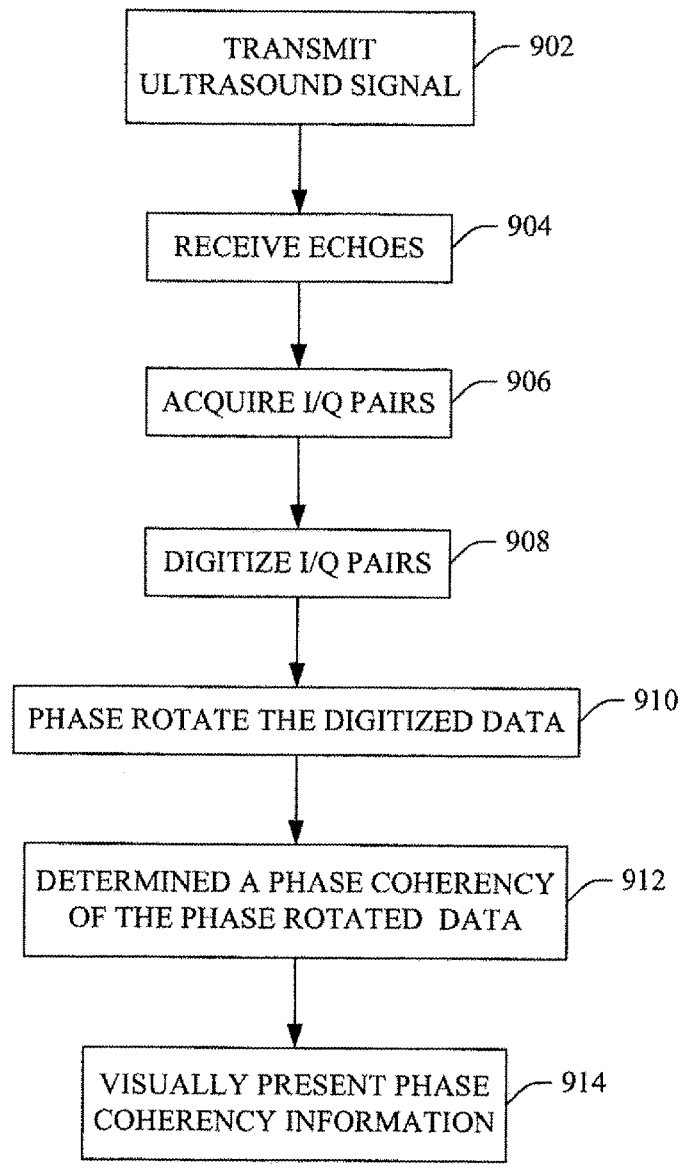
FIG. 9 illustrates an example method for acoustic signal phase coherent processing.

FIG. 9 illustrates an example method in accordance with the disclosure herein.

It is to be understood that the following acts are provided for explanatory purposes and are not limiting. As such, one or more of the acts may be omitted, one or more acts may be added, one or more acts may occur in a different order (including simultaneously with another act), etc.

At 902, one or more transducer elements are excited to transmit a signal into a field or view or examination region.

At 904, echoes, corresponding to interaction of the signal with structure in the field of view, are received by the one or more transducer elements.

At 906, I/Q pairs are acquired from the echoes, as described herein and/or otherwise.

At 908, the I/Q pairs are digitized, as described herein, for example, via 2 or 3-bits, and/or otherwise.

At 910, the digitized data is phase rotated, as described herein and/or otherwise.

At 912, phase coherency information is determined from the digitized data, as described herein and/or otherwise.

At 914, the phase coherency information is visually presented, as described herein and/or otherwise.

The above may be implemented by way of hardware and/or a computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An imaging system, comprising:
   one or more processing chains respectively for one or more transducer element channels, wherein a processing chain of the one or more processing chains, includes:
   an N bit digitizer that quantizes only a phase of an I/Q pair of an analog RF signal received on a corresponding transducer element channel, producing an N-bit digital representation, wherein the N bit digitizer includes:
   an I comparator that compares an I sample of the I/Q pair with a reference signal and outputs a first binary signal indicating whether the I sample is positive or negative, relative to the reference signal; and
   a Q comparator that compares a Q sample of the I/Q pair with the reference signal and outputs a second binary signal indicating whether the Q sample is positive or negative, relative to the reference signal;
   a phase rotation processor that focuses the N-bit digital representation of only the phase of the analog RF signal received on the corresponding transducer element channel through phase rotation through phase additions or subtractions, and outputs a focused N-bit quantized value, where N is a predetermined positive integer; and
   a phase coherent processor that processes the focused N-bit digital representation and generates a signal indicative of a phase coherency of the N-bit digital representation.

2. The system of claim 1, wherein N is one of one, two or three.

3. The system of claim 1, wherein the phase rotation processor focuses the N-bit representation without multiplications.

4. The system of claim 1, wherein the reference signal is one of an electrical ground, an electrical voltage, or an electrical current.

5. The system of claim 1, the, comprising:
a first analog polarity inverter that inverts a sign of the I sample in response to the first binary signal indicating the I sample is negative and outputs the I sample or an inverted I sample;
a second analog polarity inverter that inverts a sign of the Q sample in response to the second binary signal indicating the Q sample is negative and outputs the Q sample or an inverted Q sample; and
a third comparator that receives the outputs of the first and second analog polarity inverters, compares a polarity of the first and second analog polarity inverters, and outputs a third binary signal that indicates a relative magnitude between the I and Q analog samples.

6. The system of claim 5, wherein the polarity inverters include a pair of unity-gain buffers, one inverting and one non-inverting, whose outputs are multiplexed based on the first and second binary signals.

7. The system of claim 5, wherein the polarity inverters include a switched-capacitor circuit to perform the inversion.

8. The system of claim 5, wherein the polarity inverters include a set of switches that exchange two differential branches of a signal path.

9. The system of claim 1, the processing chain, further comprising:
an I/Q sampler that acquires the I/Q pair, wherein the I/Q sampler samples at quarter-period sample spacing to acquires the I/Q pair.

10. The system of claim 1, wherein the phase coherent processor employs at least one of a phase coherence factor approach, a sign coherence factor approach, a short lag spatial coherence (SLSC) metric approach, a quadrature coherence factor approach, or spectral content approach.

11. The system of claim 1, wherein the N-bit digitizer quantizes the phase of the analog RF signal by quantizing the analog RF signals after delay and apodization operations are performed on the analog RF signals.

12. The system of claim 1, further comprising:
an M-bit digitizer that digitizes a value indicative of an amplitude of the analog RF signal of each channel, producing an M-bit amplitude value, where M is a predetermined positive integer, and wherein the phase coherent processor utilizes both the N-bit phase value and the M-bit amplitude value to discriminate between phase coherent large amplitude signals, phase coherent low amplitude signals, and phase incoherent signals.

13. A method, comprising:
processing a plurality of digital representations of only a phase of an analog RF ultrasound signal;
generating quantized values for the plurality of digital representations by:
comparing an I sample of the I/Q pair with a reference signal and outputting a first binary signal indicating whether the I sample is positive or negative, relative to the reference signal; and
comparing a Q sample of the I/Q pair with the reference signal and outputting a second binary signal indicating whether the Q sample is positive or negative, relative to the reference signal; and
generating focused quantized values for the plurality of digital representations from the quantized values through phase rotations that include phase additions or subtractions; and
generating a signal indicative of a phase coherency of the focused quantized values.

14. The method of claim 13, further comprising:
visually presenting the phase coherency.

15. The method of claim 14, further comprising:
acquiring the I/Q pair by sampling the analog RF ultrasound signal.

16. The method of claim 13, wherein the phase is quantized by processing the I/Q pair with a plurality of analog polarity inverters.

17. The method of claim 13, wherein the digital representations includes N-bit digital representations, wherein N is greater than three.

18. The method of claim 13, wherein the processing does not include any multiplications.

19. A system, comprising:
an apparatus, comprising:
a display;
memory with instructions; and
a processor that processes the instructions, which causes the processor to:
processing a plurality of digital representations of only a phase of an analog RF ultrasound signal;
generating quantized values for the plurality of digital representations by comparing an I sample of the I/Q pair with a reference signal and outputting a first binary signal indicating whether the I sample is positive or negative, relative to the reference signal, and comparing a Q sample of the I/Q pair with the reference signal and outputting a second binary signal indicating whether the Q sample is positive or negative, relative to the reference signal;
focusing the quantized values through phase rotation by phase additions or subtractions and no multiplications;
determining phase coherency information of the focused quantized values; and
displaying the phase coherency information.

20. The system of claim 19, wherein the apparatus is selected from a group consisting of: a sonar system, a radar system, or a non-destructive evaluation system.

21. The system of claim 19, the apparatus, further comprising:
a transducer that generates the analog RF ultrasound signal.

22. The system of claim 21, wherein the apparatus is a hand-held device which includes a housing that houses the display, the memory, the processor, and the transducer.

23. The system of claim 21, further comprising:
a probe that houses the transducer; and
a console that houses the memory and the processor, wherein the probe, the console and the display are separate devices and the probe and the display are in electrical communication with the console.

* * * * *